July 30, 1957 W. A. KATES 2,800,919
FLUID FLOW REGULATOR
Filed Nov. 15, 1951 3 Sheets-Sheet 1

INVENTOR.
Willard A. Kates
BY

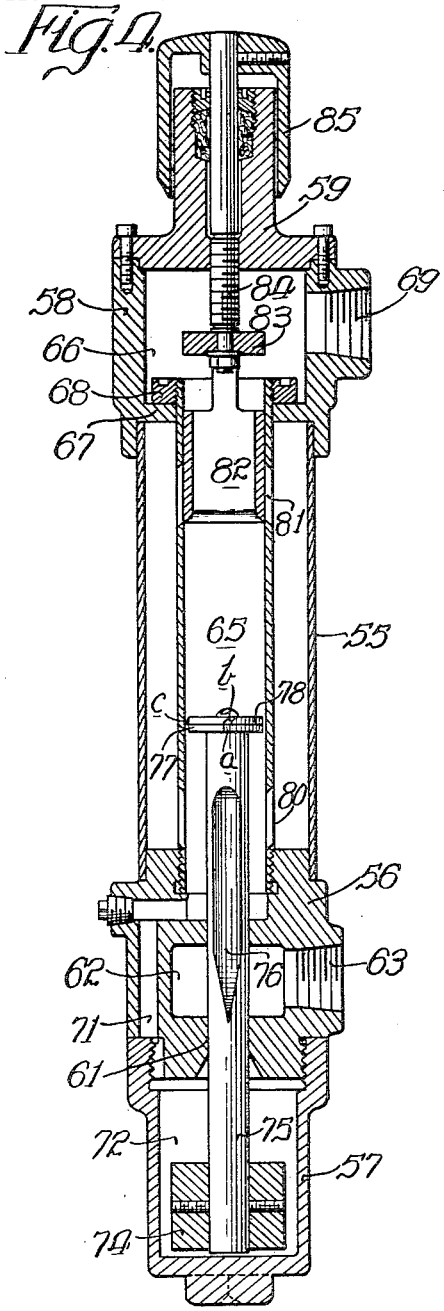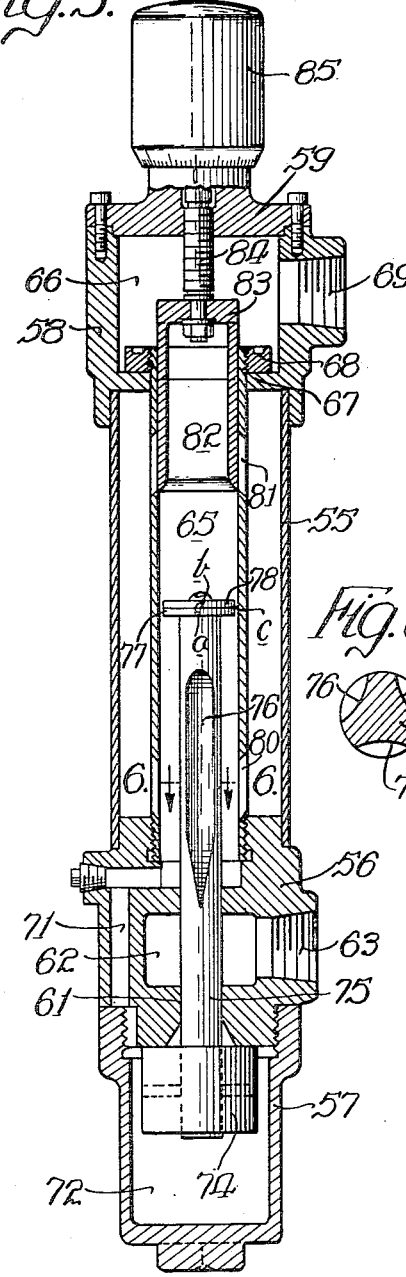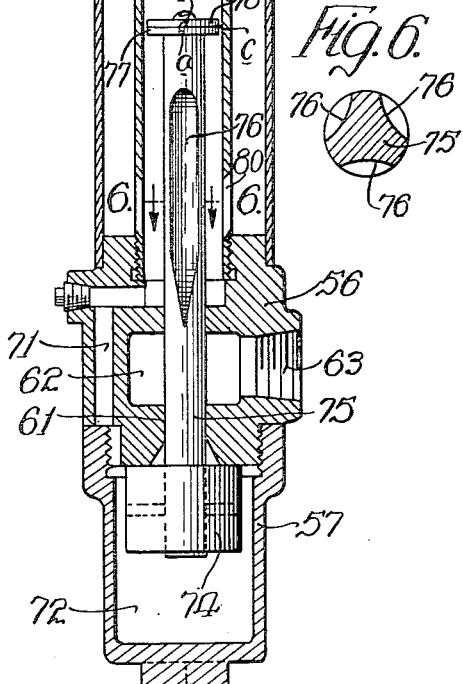

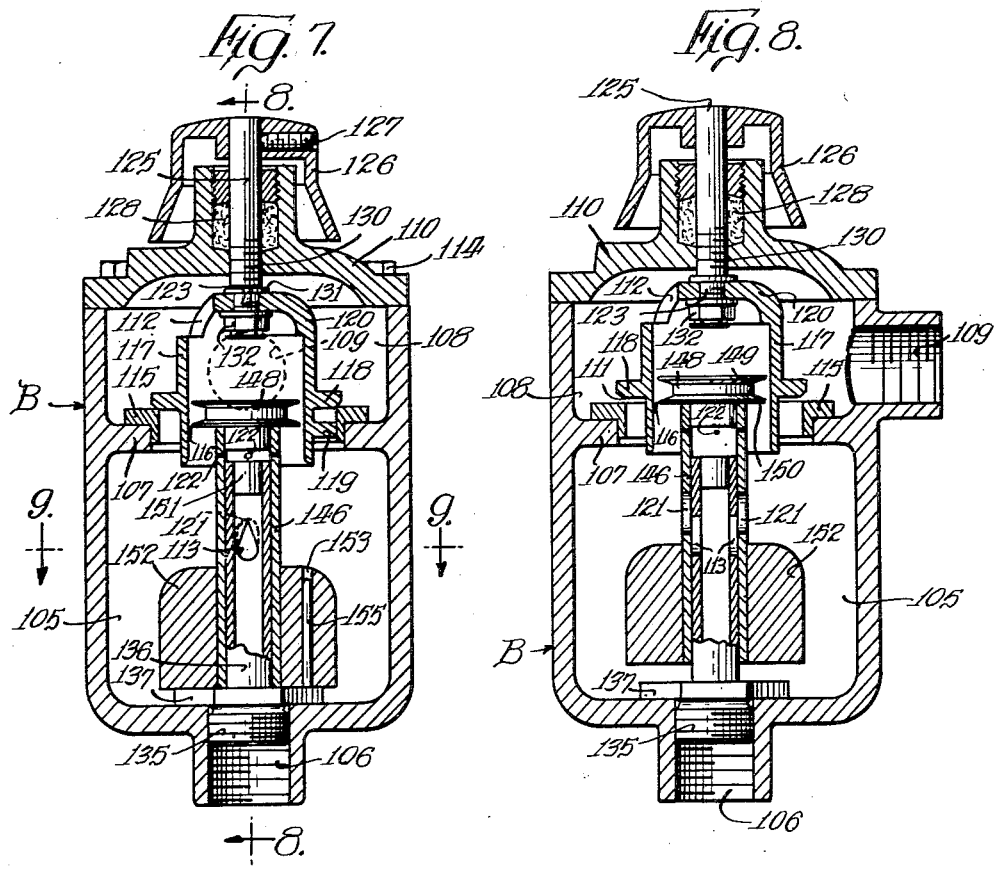

United States Patent Office 2,800,919
Patented July 30, 1957

2,800,919
FLUID FLOW REGULATOR
Willard A. Kates, Winnetka, Ill.

Application November 15, 1951, Serial No. 258,939

21 Claims. (Cl. 137—504)

This invention relates to devices for regulating the flow of fluids; it is concerned more specifically with such a device that is adapted for insertion into a conduit system wherein fluids, either liquid or gaseous, are conveyed, the purpose being to control or regulate the flow rate of any such fluid in accordance with its volume, and substantially irrespective of pressure variations.

This application is a continuation-in-part of my co-pending applications Serial Nos. 108,142 and 197,203 filed August 2, 1949 and November 24, 1950, and now abandoned, respectively.

It is an object of the invention to provide a fluid flow regulator of the type indicated having improved construction and improved operating characteristics. More specifically stated, it is an object to provide an improved regulator mechanism for controlling or regulating the flow of fluids through a conduit system, wherein the device is rendered accurately responsive to a velocity transformation of the flowing fluid and/or its accompanying pressure differential, so as to effect the desired control or regulating functions.

Still more specifically stated, it is an object of the invention to provide an improved regulator mechanism of the foregoing type having an improved sensitivity of response, and which is accurately operable throughout a large pressure range of the conducted fluids.

Yet another object of the invention is to produce a fluid flow regulator of the type described in the preceding paragraph in which the housing is so constructed and arranged so as substantially to eliminate the effect of the velocity of the fluid to be regulated so that the regulating means may operate in response to fluid pressure differential regardless of the velocity of the fluid.

Various other objects, advantages, and features of the invention will be apparent from the following specification when taken in conjunction with the accompanying drawings wherein certain suggestive embodiments of the invention are set forth in the manner following:

Figure 4 is a longitudinal section through a housing wherein is a flow regulating mechanism of modified construction;

Figure 5 is a view similar to Figure 4 showing the flow regulating mechanism moved to another position;

Figure 6 is a transverse section through the impeller rod, taken on line 6—6 of Figure 5;

Figure 7 is a longitudinal section through a modified form of regulator housing showing the flow regulating mechanism therewithin;

Figure 8 is a view like Figure 7 taken along line 8—8 of Figure 7 but with the flow regulating mechanism moved to another position; and Figure 9 is a transverse section through the apparatus shown in Figure 7 and taken substantially along the line 9—9 thereof.

Figure 1:
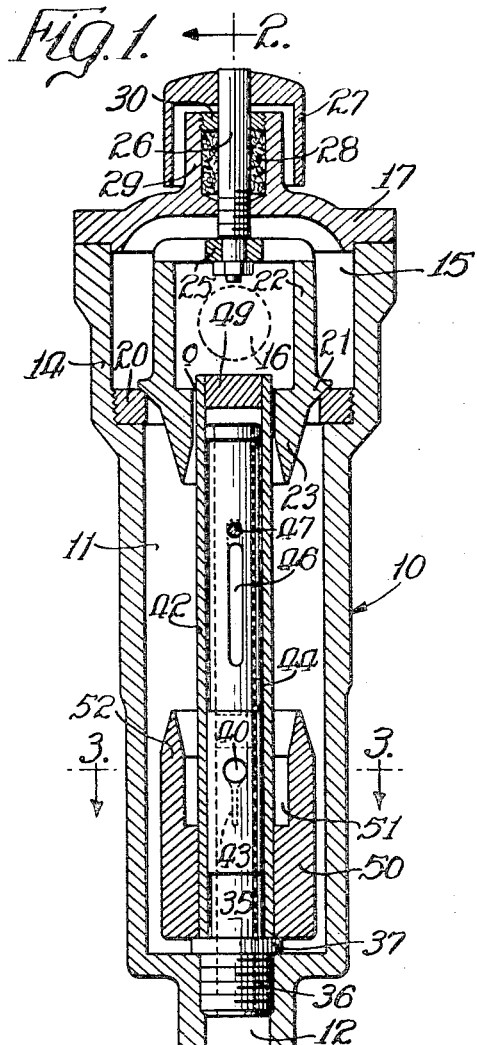
Figure 1 is a longitudinal section through the housing and the flow regulating mechanism therewithin.

While this invention is susceptible of embodiments in many different forms, there are shown in the drawings and will herein be described in detail three specific embodiments, with the understanding that the present disclosure is to be considered as an exemplification of the principles of the invention and is not intended to limit the invention to the embodiments illustrated. The scope of the invention will be pointed out in the appended claims.

Figure 2:
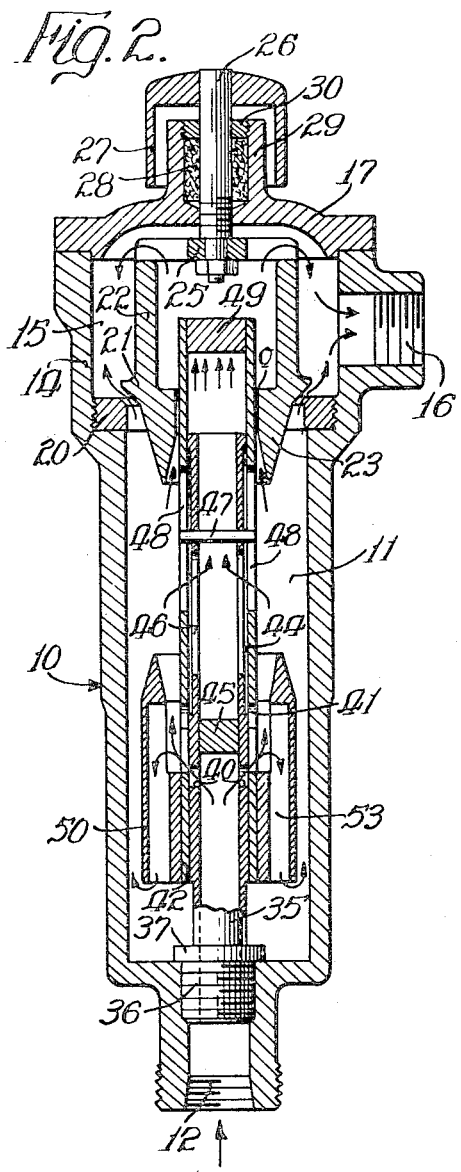
Figure 2 is a similar view, taken on line 2—2 of Figure 1, but with the flow regulating mechanism moved to another position.
Figure 3:
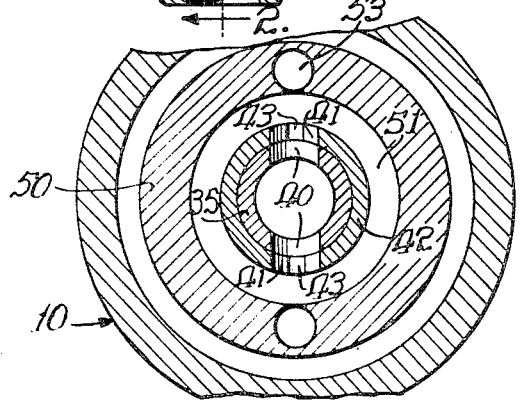
Figure 3 is an enlarged transverse section therethrough, taken on line 3—3 of Figure 1.

According to the construction illustrated in Figs. 1–3, the housing 10, here shown as having its axis vertically disposed, provides a main chamber 11 into which fluid may enter through an inlet opening 12 at the bottom. This chamber extends to the upper region of the housing where its walls are outset at 14 to form an outlet chamber 15 having a lateral outlet opening 16. A cover 17 which is affixed to the top end of the housing provides a closure therefor. When operatively installed the inlet and outlet openings are interposed in a fluid system in the customary way.

An annular ring 20 is mounted within the outlet chamber at the point of its juncture with the main chamber of the housing. The upper inner edge of this ring is shown as beveled to provide a seat for a main valve 21 which comprises a tapered shoulder outstanding from a shell 22 whose lower end portion 23 extends downwardly to terminate well within the main chamber 11.

At its upper end the shell 22 is open except where crossed by one or more bars 25 to which are connected a stem 26 that is threaded in its lower end region at a point where it extends upwardly through a tapped opening in the cover 17 for screw threaded connection therewith. At its upper end the stem carries a fixed handle 27 comprising a thimble which is desirably marked with graduations opposite a scale to indicate visually the extent of the valve adjustment at any time. Surrounding the stem is a packing 28 enclosed within a cup which is provided by circular walls 29 rising from the cover. A closure disc 30 that is screw threaded into the upper open end of the cup serves to confine and compress the packing in place.

There is assembled axially within the main chamber a fixed central tube 35 whose lower end is formed with a screw threaded base 36 surmounted by a flange 37. The walls surrounding the inlet opening 12 are interiorly threaded to receive the base and coact with the threads thereof to support the tube 35 fixedly in place. When so installed in the housing, the central tube will extend vertically for substantially the full length of the main chamber.

In its lower region the tube is provided with ports 40, here shown as two in number and disposed oppositely of each other and of other registering ports 41 in a surrounding sleeve 42 which is freely slidable vertically upon the central tube. Each sleeve port 41 is slotted downwardly at 43 and of decreasing width so that, while maintaining communication with the proximate tube port 40 during ascending movement of the sleeve, the area of the opening therethrough is diminished. The upper end region of the sleeve extends into the interior of the shell 22 with a slight clearance between itself and the lower end portion 23 of the shell to provide therewith an annular orifice o. The sleeve end reigon, where surrounded by the shell, constitutes an impeller and will be so referred to herein.

For a limited distance, starting at a point just below its upper end, the fixed tube 35 is reduced slightly in external diameter to provide between itself and the surrounding sleeve an elongated clearance space 44 which continues toward the ports 40. Interiorly of the tube, at a point just above these ports is fixedly secured a closure plug 45. The tube walls above this plug are slotted longitudinally at 46, and thereabove I provide a cross pin 47 whose ends extend outwardly beyond the tube to lie within a pair of slots 48 which are formed in the walls of the sleeve 42. This pin which is arranged to engage opposite ends of the slots 48, when the sleeve is moved vertically, acts both to fix the range of such movements and to hold the sleeve against rotation so as to assure constant communication between the ports 41 and the tube ports 40. The slots 46 and 48 constitute an upper set of ports through which fluid may pass from the main chamber 11 into the central tube and vice versa to freely maintain an equalizing pressure. Above these slots 48 and at its top the sleeve 42 is closed, as by a plug 49.

Affixed to the bottom end portion of the sleeve so as to move therewith is a relatively weighty cylindrical body 50 which, as shown terminates flush therewith. The lowermost position of the sleeve (see Fig. 1) is determined by engagement of the stop pin 47 with the upper end of the two slots 48 and at that point there still remains a substantial clearance between the bottoms of the weight and of the main chamber 11. In its upper end region the body 50 is recessed to provide an annular chamber 51 having an outer wall 52 tapering inwardly at the top from its opposite sides to provide expanding orifices through which the fluid may swiftly ascend without turbulence as it moves upwardly into the main chamber 11. The chamber 51 is disposed oppositely of the tapered slots 43 of the two ports 41 of the sleeve 42 so as to communicate therewith. In addition, the weighted body 50 is formed at points opposite the two sleeve ports 41 with vertical passages 53 (see Fig. 3) extending downwardly from the chamber 51 and opening out upon the bottom of the body.

In operation, fluid passing through the inlet 12 enters the central tube 35 from which it escapes into the main chamber 11 at places and in relative amounts as determined by the vertical position of the sleeve 42. In the lowermost position of Fig. 1, the ports 40 and 41 are in full register, and so are the slotted upper ports 46 and 48. Fluid passing from the tube into the main chamber is free to ascend through the orifice o into the outlet chamber 15 from which it emerges through the outlet opening 16.

Some of the fluid passing out of the tube 35 will, upon emerging from the ports 40 and 41, be confronted by the walls 52 and thereby be caused to change its direction of flow the amount of which may be very considerable. Some of the fluid will then flow downwardly through the vertical passages 53 to emerge again below the weight 50, thence to move outwardly and upwardly to rejoin the main body of the fluid. This fluid flow, first down, then under and alongside the weight, will assure equal pressures above and below the weight; otherwise, the force of the orifice differential pressure might be augmented or opposed by any differences in pressures at opposite ends of the weight. It is very desirable that such a pressure balance be maintained in view of the potentially high velocity of the fluid emerging from the ports of the tube. As fluid passing out the ports 40 and 41 is traveling substantially horizontally in the chamber, such flow of fluid over the top of the weight would cause a pressure drop at such portion of the weight relative to the pressure on the portion of the bottom of the weight vertically therebeneath. Such pressure drop would, of course, upset the equilibrium of the weight and would vary depending upon the velocity of the fluid passing out of the ports 40 and 41. By providing the openings 53 such differential pressure between the top and bottom of the weight caused by the velocity of the fluid entering the chamber is eliminated.

In moving through the annular orifice, the fluid establishes a pressure differential between the two sides of the impeller. Downstream is at the top, so that the pressure created on the upstream is extended into the sleeve interior as well. The pressure differential is then concentrated on opposite sides of the plug 49 at the top end of the sleeve. As a result, the sleeve will tend to rise, lifting with it the weighted body 50, and restricting the fluid flow through the lower valve ports 40 and 41; if at the same time the main valve 21 be adjusted slightly off of its seat, there will be opened up at this point a passage through which fluid may be shunted to join with the fluid passing through the annular orifice o on its way to the outlet 16. Pressure across this orifice will drop until an equilibrium is reached, this taking place when the inlet valve ports 40 and 41 admit just sufficient liquid to maintain a pressure differential at the orifice. The position of the sleeve which affects the inlet valve port openings is determined only by the pressure differential across the annular orifice, and hence by the flow therethrough.

Whenever the main valve is opened slightly, fluid will tend to bypass the orifice and fluid pressure on and within the sleeve will diminish; the sleeve and weight assembly will then drop, additional fluid will then be admitted, and the differential pressure across the orifice and within the sleeve will be restored to its previous value. This differential pressure will then be present across the main valve also, and the flow therethrough will be determined by this differential pressure. This valve accordingly serves to permit shunting of the fluid in its movement from the main chamber 11 into the outlet chamber 15. A change in inlet pressure and/or outlet pressure will simply mean that the impeller similarly adjusts its position to restore and maintain the differential pressure drop across it. In so doing, it not only restores the flow through the orifice to its previous value, but it also adjusts the flow through the main or shunt valve to its previous value. The regulating action is thus automatic.

A modified construction of fluid regulating mechanism, specifically different but the same in purpose and operation, is illustrated in Figs. 4–6. Here the cylindrical walls of the chambered housing 55 connect at the lower end with a base casting 56 from which depends a well 57, the housing walls also mounting at the top a head casting 58 surmounted by a cover 59. The connections between these several parts are fluid tight.

The base casting is formed with an axial passageway 61 which traverses an inlet chamber 62 in communication with an inlet opening 63. On its top side this casing is socketed to receive the lower end portion of a central tube 65 which is fixedly secured to and supported by the base casting. This tube extends upwardly through the housing and into an outlet chamber 66 provided by the head casting 58 and which is formed with an inwardly extending ledge 67 whereon is rested a ring 68 in screw threaded connection with the tube 65 adjacent its upper end. An outlet opening 69 for the outlet chamber is also provided.

Within the base casting 56 is a passageway 71 leading from below the tube 65 to a bottom chamber 72 that is provided in the well 57. Within the bottom chamber is a weight 74 affixed to the lower end portion of a rod 75 which is slidably extended through the axial passageway 61 so as to be freely reciprocable therein. This rod is round in cross section except in a medial region extending from within the inlet chmber 62 to a point well within the tube 65 where it is provided with longitudinal grooves 76 (see Fig. 6) each tapering to zero at its lower end. At the upper end of the rod is fixedly mounted an impeller which may take the form of a pair of discs 77 and 78, one having a radial slot $a$ defined by edge walls which are in parallelism with the axis of the tube 65 and the other having a radial slot $b$ whose edge walls are pitched so that, in response to impingement of fluid passing therethrough, a rotary force will be imparted thereto. By adjusting the one disc rotatively with respect to the other, the clearance for fluid passing through the pitched slot can be modified, as desired. The diameters of the discs may be the same, each extending short of the full distance across the tube, internally thereof, so as to provide a narrow orifice c for fluid to pass therethrough.

The tube 65 is formed with one or more slotted ports 80 in its lower end region, communicating with the housing chamber near its bottom; other similar ports 81 are also formed in a higher up portion of the tube. Slidably fitted within the tube so as to close all or part of the area of the ports 81 is a sleeve valve 82 having at its top a cross bar 83 to which is connected the lower end of a stem 84 having screw threads for coaction with a tapped hole in the cover 59 through and beyond which this stem extends to carry at its top a handle 85 comprising a thimble whereon are desired graduation marks. Suitable packing is placed around the stem where it emerges from the cover to prevent escape of fluid at this point.

In operation, fluid entering through the inlet opening 63 is free to pass upwardly alongside the impeller rod 75 within its grooves 76 so long as the rod is not in the extreme upper position of Fig. 5. The rising fluid then fills the tube 65, some of it exerting an upward pressure on the impeller, some escaping through the orifice therearound, and some also moving through the bypass into the base chamber 72. Some of the fluid within the tube 65 also passes out through the lower slots 80 to fill the housing. The fluid passing through the orifice c around the impeller is free to continue on into the outlet chamber and thence emerge through the outlet opening 69.

Variation in the flow is effected by shunting fluid from the central tube outwardly through the upper slots 81 into the chambered housing for re-entrance through the lower slots 80 into the central tube 65. To produce such a shunting flow in a desired amount, the sleeve valve 82 is adjusted to the required position through the medium of its handle 85. The graduations on the edge of the handle timble may register with a suitable decimal scale, calibrated in g. p. m. or other volume units.

A further modification is shown in Figs. 7–9 in which the regulator housing is in the form of a relatively wide cylindrical body B, here shown as disposed with its axis vertical, to provide therewithin a main chamber 105 into which fluid may enter through an inlet opening 106 at the bottom. Extending inwardly of the chamber toward its upper end is a circular ledge 107 constituting a partial partition whereby to separate the main chamber 105 from an outlet chamber 108 thereabove. An outlet 109 is provided at one side of this latter chamber over which is fitted a closure cap 110 which is removably secured in place, as by screw means 114.

Upon the ledge 107 is supported a removable seat 115 for an adjuster valve. As shown, this valve is in the form of a cylinder 117 from which is outwardly extended a circumferential flange 118 beveled on its under face to engage with the seat 115 (see Fig. 7); when lifted therefrom (see Fig. 8) an adjuster orifice 111 is provided. This valve is maintained in centered relation with respect to the seat by a plurality of lugs 119 which are outwardly extended from the cylinder below the flange 118 to engage slidingly with the seat 115.

The upper end of the cylinder 117 is surmounted by a crown 120 formed by a plurality of spaced arms which are curved inwardly to join with the crown top. Openings 112 are provided laterally of the crown between the supporting arms thereof. An opening in the center of the crown, co-axially of the cylinder 117, loosely receives a threaded stud 123 at the lower end of a stem 125 to which is fitted an adjuster dial 126 in fast connection therewith as by means of a set screw 127. This stem which is surrounded by a packing gland 128 is threaded in its lower end portion at 130 to engage with a tapped opening in the crown of the closure cap 110.

A washer 131 that is carried on the stud 123 adjacent the stem 125 is arranged to engage the top of the crown 120, and a nut 132 is threaded on to the stud and engages with the crown under side, thereby supporting the crown dependingly from the stem. In response to rotation of the adjuster dial, the stem is moved up or down to carry with it the cylinder 117, thereby opening or closing, as desired the adjuster orifice 111 between its flange 118 and the seat 115.

Within the inlet opening 106 which is threaded is received the hollow base 135 of a tubular post 136 having a polygonal head 137 at its lower end. This post is extended vertically for substantially the full height of the main chamber 105 and is provided with certain lateral ports 113 which are vertically elongated and narrowed toward their upper ends. The post provides a mounting for a sleeve 146 which is slidably fitted thereupon. This sleeve extends for the full length of the main chamber and into the cylindrical interior of the adjuster valve for a substantial distance. An impeller disc 148 is fixedly carried in the top of the sleeve, this disc being formed with one or more flanges which extend relatively close to the inner face of the cylinder 117 but remain spaced therefrom to provide an impeller orifice 116 therebetween. As shown, two such flanges 149 and 150 are provided, spaced apart properly from each other and from the cylinder 117 to obtain the desired pressure differential across the impeller orifice 116.

The sleeve 146 serves as a valve through the provision of vertically elongated lateral ports 121 which are arranged to register in varying degree with the ports 113 of the tubular post 136. In the down position of Fig. 7, the ports 113 are fully exposed so that liquid ascending into the post is free to emerge laterally through the registering ports 113 and 121 to enter the main chamber 105. As the valve sleeve 146 is advanced upwardly, however, the registering areas of the two coacting ports decrease so that the lateral flow of the liquid is reduced proportionately. The sleeve 146 is also provided with a plurality of small vent openings 122 at a point just above the hollow post 136 whose upper end is closed by a plug 151, so that liquid is always free to enter or leave the variable space between the said plug and the impeller disc 148 thereabove. The variable space serves as a dashpot to reduce "hunting" of the valve means. Thus movement of the sleeve relative to the tube is dampened by the fluid in the space above the plug 151, with the amount of damping being dependent upon the size of the openings 122.

A weight 152 of generally cylindrical form surrounds the lower end portion of the sleeve 146 and is secured fast thereto so as to ascend and descend therewith. In the down position of Fig. 7 this weight rests on the head 137 as does the proximate end of the sleeve 146. A passageway 153 extends vertically through the weight at one point to slidingly receive a pin 155 which upstands fixedly from the head 137. By this means the weight-sleeve assembly is prevented from turning relative to the post 136 so that the ports 113 and 121 will always remain in the proper rotative position for registering, one with the other, when the sleeve is properly elevated for this purpose.

The outlet of the present regulator is from the upper chamber 108 inside the body where the pressure varies according to outlet demands. Between this chamber and the main chamber 105 therebelow is the impeller orifice 116 between the impeller disc 148 and the cylindrical adjuster valve 117 within which it moves. Pressure in the outlet chamber 108 is on top of the impeller disc 148 while the bottom of the disc remains exposed to pressure in the main chamber 105. Since flow of fluid to the outlet chamber 108 is restricted, the pressure in the main chamber 105 is always greater, and the difference in the two pressures creates a lifting force which acts against that of the weight 152 suspended from the impeller disc 148.

Attached to the impeller disc is the valve sleeve 146 which controls the flow entering into the main chamber 105. Any increase in pressure differential between the main and outlet chambers tends to lift the impeller disc 148, causing the valve sleeve 146 to throttle flow into the main chamber 105 so that pressure there will be reduced. A decrease in pressure differential allows the impeller disc 148 to drop, thereby moving the sleeve 146 correspondingly to enlarge the co-registering areas of the ports 113 and 121 and permit greater flow. Thus the flow into the main chamber 105 is continuously adjusted to variations in outlet resistance as reflected by pressure in the outlet chamber 108; that is to say, the action of the regulator maintains a constant, predetermined pressure differential between the two chambers 105 and 108, regardless of conditions on either side.

As long as the pressure differential is constant, the flow through an orifice of given area will also be constant, and within the limits of the instrument any desired volume of flow can be obtained simply by adjusting the size of the opening. In the present regulator, the orifice 116 surrounding the impeller disc 148 is fixed, but another orifice 111 is provided by the adjuster valve 117 so that total area of flow between the two chambers may be controlled with great accuracy. The adjuster valve is set for any desired flow by rotating the calibrated dial 126 on top of the instrument.

The three forms of fluid flow regulating mechanism herein disclosed have many features in common. In each there is an annular orifice surrounding an impeller, the orifice permitting fluid passage therethrough in an amount determined by the dimensions of the orifice and the pressure differential across the orifice. There also may be provided an adjustable shunt valve which, when open, permits some of the fluid to bypass the orifice. Because the pressure differential between the inlet and outlet chambers is maintained at a constant value, flow from one to the other is maintained at a constant rate. A change in the inlet or outlet pressure will cause the impeller to adjust its position automatically so as to maintain constant the pressure drop across itself and thus across the shunt valve also. The flow through the impeller orifice is thus restored to its previous value, and the flow through the shunt valve is also restored to its previous value.

It will be noted that in the three forms of the invention illustrated the chamber immediately preceding the orifice in which the impeller is located (which chamber in the exemplary embodiments illustrated is the inlet chamber) is of a comparatively large volume relative to the size of the valve ports. The purpose of providing a relatively large volume for this chamber is to eliminate as far as possible the effects of the velocity of the fluid on the operation of the impeller which controls the valve means. Thus, for example, the body B of the embodiment shown in Figs. 7–9 is desirably four or five times wider than is the ported sleeve 146. Thus fluid entering into the body through the ports 113 and 121 does so at a point immediately above the weight 152 where the volume of fluid opposed thereto is very substantial. This substantial volume allows the velocity energy of the fluid emerging from the upper end of the main chamber to be converted to pressure head before the fluid acts on either the impeller disc 148 or the impeller orifice 116 or the adjuster orifice 111. This means that the effective pressure on all of these parts is substantially uniform so as to contribute to the accuracy of the instrument. It may be noted at this point that, if desired, the weight 152 may be provided with vertical passages extending from the top to the bottom thereof similar to the passages 53 shown in Fig. 2.

In any event, the chambers are so designed as to contain sufficient fluid so as to absorb the velocity of incoming fluid so that the valve operates substantially entirely in response to differential pressure across the impeller and its orifice regardless of the flow rate.

Further to eliminate the effect of changes in flow rate on the impeller means are provided for shielding the impeller from the effect of the movement of the fluid through the outlet chamber, as for example the members 22 and 117 shown in Figs. 1 and 7. Thus flow through the outlet chambers to the outlets 16, 69 or 109 is around a member positioned in the outlet chamber rather than directly over the upper portion of the impellers. If it were not for such shielding members, the flow of fluid in the outlet chamber directly across the impellers would cause an aspirator action, that is, such flow would cause a pressure drop over the impellers with the amount of the pressure drop being directly related to the velocity of movement of the fluid in the outlet chamber. This again would result in the valve reacting to a velocity effect, which is not desired, rather than solely to a pressure effect across the impeller and its orifice.

There are many permissible variations in details too numerous to illustrate or describe, but all available in cases where it is desired to produce special flow characteristics. For example, the shunt valve may be provided with a seat that is flat, tapering, or grooved, to produce straight line or curved flow characteristics. Also the shunt valve handle may be arranged for manual or power operation, or for automatic control. The use of a weighted body at the lower end of the impeller sleeve or rod may obviously be replaced by a suitable spring in which case the regulator may be operated horizontally or otherwise.

I claim:

1. In a fluid flow regulator, the combination with a housing having a chamber and inlet and outlet openings communicating with the chamber and arranged for connection with a fluid system, of a valve operatively connected between the inlet and the chamber for controlling flow of fluid from the inlet into the chamber, an impeller movable within the chamber and connected to the valve for operation thereof, means surrounding the impeller but spaced therefrom to provide an annular flow passage through which fluid may pass while moving through the chamber to the outlet opening, said impeller partially obstructing said flow passage and thereby being adapted to create a pressure differential on opposite sides of the impeller sufficient to produce movement thereof and of the valve connected thereto, said impeller being directly responsive to said pressure differential and adapted to be moved thereby in a direction to move the valve toward closed position, means constantly biasing the valve toward open position, means providing an annular shunt passageway around the flow passage and comprising one part movable toward and from a second part to constitute therewith a valve for varying the total flow of fluid through the regulator.

2. In a fluid flow regulator, the combination with a housing having an inlet, an outlet and a chamber connected to the inlet and the outlet, of a valve operatively connected between the inlet and the chamber and having a discharge port opening into the chamber and comprising a movable valve member for controlling the port to control the flow of fluid from the inlet into the chamber, means providing a flow passage through which fluid from the inlet may pass to the outlet, an impeller movable in the flow passage and connected to the valve member for operation thereof, said impeller partially obstructing said flow passage and thereby being adapted to create a pressure differential on opposite sides of the impeller sufficient to produce movement thereof and of the valve member connected thereto, said impeller being directly responsive to said pressure differential and adapted to be moved thereby in a direction to move the valve toward closed position, means constantly biasing the valve toward open position, means opening into the chamber and providing a shunt passageway around the flow passage, means shielding the flow passage from the velocity effect of fluid flow through the shunt passageway, and a valve in the shunt passageway operable to vary the total flow of fluid through the regulator.

3. In a fluid flow regulator, the combination with a housing wherein is a chamber having a relatively wide diameter and, near opposite ends of the chamber, inlet and outlet openings for connection with a fluid system, of an axially movable sleeve valve in connection with the inlet opening for admitting fluid into the chamber, the sleeve valve diameter being but a fraction of that of the chamber, an impeller movable axially within the chamber and connected to the sleeve valve for operation thereof, means surrounding the impeller but spaced therefrom to provide therewith a flow passage through which fluid is free to pass while moving endwise through the chamber to the outlet opening, said impeller partially obstructing said flow passage thereby to create a pressure differential on opposite sides of the impeller sufficient to produce movement thereof and of the sleeve valve connected thereto, said impeller being directly responsive to said pressure differential and adapted to be moved thereby in a direction to move the valve toward closed position, means constantly biasing the valve member toward open position, the sleeve valve, when opened, permitting release of fluid jets into the chamber in a direction radially outwardly of the chamber for free movement transversely thereinto to join with the relatively large fluid body therein and convert the velocity energy of the entering jets into pressure head before acting on the impeller, to maintain a substantially uniform pressure at all points within the chamber, a valve having a seat surrounding the impeller in spaced relation thereto to provide for the fluid exteriorly thereof and within the chamber a shunt passageway to the outlet opening whereby to vary the total flow through the regulator, and a crown surrounding the flow passage and having openings to prevent aspirator action resulting from fluid flow through the flow passage.

4. In a fluid flow regulator, the combination with an open-top housing wherein are upper and lower chambers each having a relatively wide diameter and, near opposite ends of the housing, inlet and outlet openings for connection with a fluid system, of an axially movable sleeve valve in connection with the inlet opening for admitting fluid into the lower chamber, the sleeve valve diameter being but a fraction of that of the lower chamber, an impeller movable axially within the housing at a point substantially between the two chambers and connected to the sleeve valve for operation thereof, means surrounding the impeller but spaced therefrom to provide therewith a flow passage through which fluid is free to pass upwardly while moving endwise from the lower chamber to the upper chamber and to the outlet opening, said impeller partially obstructing said flow passage, creating a pressure differential on opposite sides of the impeller sufficient to produce movement thereof and of the sleeve valve connected thereto, said impeller being directly responsive to said pressure differential and adapted to be moved thereby in a direction to move the valve toward closed position, means constantly biasing the valve member toward open position, the sleeve valve, when opened, permitting release of fluid jets radially into the lower chamber for free movement transversely thereinto to join with the relatively large fluid body and convert the velocity energy of the entering jets into pressure head before acting on the impeller, to maintain a substantially uniform pressure at all points within the chamber, a valve seat surrounding the impeller in spaced relation thereto to provide for the fluid exteriorly thereof and within the chamber a shunt passageway to the outlet opening whereby to vary the total flow through the regulator, a crown surmounting the flow passage to prevent aspirator action resulting from fluid flow through the upper chamber, said crown having an opening therein, a shunt valve portion on the crown and positioned to engage the valve seat, a closure for the open top of the housing, and axially adjustable rotatable means depending from the closure and connected to the crown and movable to shift the shunt valve portion vertically to a selected valvular position within the shunt passageway.

5. In a fluid flow regulator, the combination with a housing wherein is a chamber having a relatively wide diameter and, near opposite ends of the chamber, inlet and outlet openings for connection with a fluid system, of an axially movable sleeve valve having a plurality of ports in connection with the inlet opening for admitting fluid into the chamber, the sleeve valve diameter being but a fraction of that of the chamber, an impeller movable axially within the chamber and connected to the sleeve valve for operation thereof, a weight carried fixedly by the sleeve and disposed wholly below the ports thereof, means fixedly extending upwardly within the housing chamber in slidable engagement with the weight to maintain the latter in a fixed rotative position, means coacting with the impeller but spaced therefrom to provide therewith a flow passage through which fluid is free to pass while moving endwise through the chamber to the outlet opening, said impeller partially obstructing the flow passage and thereby creating a pressure differential on opposite sides of the impeller sufficient to produce movement thereof and of the sleeve valve connected thereto against the bias of the weight, the sleeve valve, when opened, permitting release of fluid jets radially into the chamber for free movement transverse thereacross to join with the relatively large fluid body therein and convert the velocity energy of the entering jets into pressure head before acting on the impeller, to maintain a substantially uniform pressure at all points within the chamber, means surrounding the impeller in spaced relation thereto providing for the fluid within the chamber a shunt passageway to the outlet opening and a valve for said shunt passageway whereby to vary the total flow through the regulator.

6. In a fluid flow regulator, the combination with a housing wherein is a chamber having a relatively wide diameter and, near opposite ends of the chamber, inlet and outlet openings for connection with a fluid system, of an axially movable sleeve valve in connection with the inlet opening for admitting fluid into the chamber, the sleeve valve diameter being but a fraction of that of the chamber, an impeller movable axially within the chamber and connected to the sleeve valve for operation thereof, a hollow post in connection with the inlet opening upstanding from the housing bottom and extended axially within the sleeve to provide a sliding support therefor, the post and sleeve being provided with lateral ports through which fluid passing upwardly is free to escape in varying degree into the chamber according to the relative axial position of the sleeve, a weight carried fixedly by the sleeve and disposed wholly below the lateral ports thereof, means fixedly extending upwardly within the housing in sliding engagement with the weight to maintain the latter in a fixed rotative position wherein the lateral ports in the sleeve will register with those of the post when the sleeve is in the proper axial position, means coacting with the impeller but spaced therefrom to provide therewith a flow passage through which fluid is free to pass while moving endwise through the chamber to the outlet opening, said impeller partially obstructing the flow passage and thereby creating a pressure differential on opposite sides of the impeller sufficient to produce movement thereof and of the sleeve valve connected thereto against the bias of the weight, and said impeller being directly responsive to said pressure differential and movements of the impeller, due to increases or decreases in differential pressure, operating to move the sleeve valve toward closed or open position, respectively, the sleeve valve, when opened, permitting release of fluid jets radially into the chamber for free movement transversely thereacross to join with the relatively large fluid body therein and convert the velocity energy of the entering jets into pressure head before acting on the impeller to maintain a substantially uniform pressure at all points within the chamber.

7. In a fluid flow regulator, the combination with a housing wherein is a chamber having near opposite ends thereof inlet and outlet openings for connection with a fluid system, of an axially movable sleeve valve having a plurality of ports in connection with the inlet opening for admitting fluid into the chamber, an impeller movable axially within the chamber and connected to the sleeve valve for operation thereof, a weight carried fixedly by the sleeve and disposed wholly below the ports thereof, means fixedly extending upwardly within the housing chamber in slidable engagement with the weight to maintain the latter in position, means coacting with the impeller but spaced therefrom to provide therewith a flow passage through which fluid is free to pass while moving endwise through the chamber to the outlet opening, said impeller partially obstructing the flow passage and thereby creating a pressure differential on opposite sides of the impeller sufficient to produce movement thereof and of the sleeve valve connected thereto, said impeller being directly responsive to said pressure differential and adapted to be moved thereby in a direction to move the valve toward closed position, said weight constantly biasing the valve member toward open position, the sleeve valve, when opened, permitting release of fluid jets radially into the chamber for free movement radially thereof to join with the relative large fluid body therein, and means surrounding the impeller in spaced relation thereto providing for the fluid within the chamber a shunt passageway to the outlet opening and a valve for said shunt passageway whereby to vary the total flow through the regulator.

8. In a fluid flow regulator, the combination with a housing wherein is a chamber having near opposite ends thereof inlet and outlet openings for connection with a fluid system, of an axially movable sleeve valve in connection with the inlet opening for admitting fluid into the chamber, an impeller movable axially within the chamber and connected to the sleeve valve for operation thereof, a hollow post in connection with the inlet opening upstanding from the housing bottom and extended axially within the sleeve to provide a sliding support therefor, the post and sleeve being provided with lateral ports through which fluid passing upwardly is free to escape in varying degree into the chamber according to the relative position of the sleeve and port, a weight carried fixedly by the sleeve and disposed wholly below the lateral ports thereof, means fixedly extending upwardly within the housing in sliding engagement with the weight to maintain the latter in a fixed rotative position wherein the lateral ports in the sleeve will register with those of the post when the sleeve is in the proper axial position, means coacting with the impeller but spaced therefrom to provide therewith a flow passage through which fluid is free to pass while moving endwise through the chamber to the outlet opening, said impeller partially obstructing the flow passage and thereby creating a pressure differential on opposite sides of the impeller sufficient to produce movement thereof and of the sleeve valve connected thereto against the bias of the weight, and said impeller being directly responsive to said pressure differential and movements of the impeller due to increases or decreases in pressure differential operating to move the sleeve valve toward closed or open position, respectively, the sleeve valve, when opened, permitting release of fluid jets radially into the chamber for free movement radially thereof to join with the relatively large fluid body therein, means surrounding the impeller in spaced relation thereto providing for the fluid within the chamber a shunt passageway to the outlet opening and a valve for said shunt passageway whereby to vary the total flow through the regulator.

9. In a fluid flow regulator, the combination with a housing having an inlet and an outlet and a chamber connected to the inlet and the outlet, of a valve having a port opening into the chamber and having a valving portion movable to control the port and thus the flow of fluid from the inlet to the outlet, means providing a flow passage through which a portion of the fluid from the inlet is free to pass, an impeller movable in the flow passage and connected to the valve for operation thereof, said impeller partially obstructing said flow passage and thereby being adapted to create a pressure differential on opposite sides of the impeller sufficient to produce movement thereof and of the valve connected thereto, said impeller being directly responsive to said pressure differential and adapted to be moved thereby in one direction, means constantly biasing the valve toward movement in the other direction, a passageway opening into the chamber and providing a shunt passageway around the flow passage, and means shielding the impeller from the flow of fluid through the shunt passageway.

10. In a fluid flow regulator, the combination with a housing having an inlet and an outlet and a chamber connected to the inlet and the outlet, of a valve having a port communicating with the chamber and having a valving portion movable to control the port and thus the flow of fluid from the inlet to the outlet, means providing a flow passage through which a portion of the fluid from the inlet is free to pass, an impeller movable in the flow passage and connected to the valve for operation thereof, means shielding the impeller from the velocity effect of fluid flow in the inlet and outlet, said impeller partially obstructing said flow passage and thereby being adapted to create a pressure differential on opposite sides of the impeller sufficient to produce movement thereof and of the valve connected thereto, said impeller being directly responsive to said pressure differential and adapted to be moved thereby to move the valve in one direction, and means constantly biasing the valve toward movement in the other direction.

11. A flow regulator comprising a casing having an inlet chamber and an outlet chamber interconnected by a flow passage, an inlet port connected to the inlet chamber and an outlet port connected to the outlet chamber, said inlet chamber having a relatively large volume to produce a substantial reduction in the velocity of fluid flowing thereinto from the inlet to convert the velocity energy of the entering fluid into pressure head, a valve having a port communicating with the inlet chamber and having a valving portion movable to control the port and thus the flow of fluid from the inlet to the outlet, an impeller movably mounted in the flow passage and connected to the valve for moving the same, said impeller partially obstructing the flow passage and thereby being adapted to create a pressure differential on opposite sides of the impeller and being movable in one direction in response to increased pressure differential, means biasing the valve toward movement in the other direction, a shunt passageway interconnecting the inlet and outlet chambers independent of the flow passage, a shunt valve having a valve portion movable in the shunt passageway to control the flow of fluid therethrough, and means shielding the impeller from the velocity effect of fluid flow through the shunt passageway.

12. A flow regulator comprising a casing having an inlet chamber and an outlet chamber interconnected by a flow passage, an inlet port connected to the inlet chamber and outlet port connected to the outlet chamber, said inlet chamber having a relatively large volume to produce a substantial reduction in the velocity of fluid flowing thereinto from the inlet to convert the velocity energy of the entering fluid into pressure head, a valve having a port communicating with the inlet chamber and having a valving portion movable to control the port and thus the flow of fluid from the inlet to the outlet, an impeller movably mounted in the flow passage and connected to the valve for moving the same, said impeller partially obstructing the flow passage and thereby being adapted to create a pressure differential on opposite sides of the impeller and being movable in one direction in response to increased pressure differential, means in the outlet chamber shielding the flow passage from the velocity effect of fluid flowing therethrough, means biasing the valve toward movement in the other direction, and a manually operable shunt valve interconnecting the inlet and outlet chambers to permit flow therethrough independently of flow through said flow passage.

13. A fluid flow regulating device comprising a casing having an inlet and an outlet, means in the casing forming an orifice through which at least a portion of fluid entering the inlet is directed, an impeller mounted in the orifice for movement parallel to the flow therethrough, said impeller partially obstructing the flow through the orifice to create a pressure differential on opposite sides of the impeller, a tube in the casing having its interior connected at one end to the inlet, means closing the other end of the tube, said tube having an opening therethrough intermediate the ends thereof, a sleeve slidably surrounding the tube and having a port controlling the opening in the tube, said sleeve being closed at the end thereof adjacent the closed end of the tube, said sleeve carrying the impeller and being movable therewith in one direction in response to increasing pressure differential on opposite sides of the impeller, said movement of the sleeve providing a space between the closed ends of the tube and sleeve with said space forming a dashpot for damping movement of the sleeve, an opening in the sleeve communicating with said dashpot space, and means biasing the sleeve in the other direction.

14. In a fluid flow regulator, the combination with a housing having an inlet opening into an inlet chamber and an outlet connected to an outlet chamber of a valve having a port establishing communication between the inlet and the inlet chamber, said valve having a valving portion movable to control the port, means separating the inlet chamber from the outlet chamber and providing a flow passage through which a portion of the fluid from the inlet is free to pass, an impeller movable in the flow passage and connected to the valve for operation thereof, said impeller partially obstructing said flow passage and thereby being adapted to create a pressure differential on opposite sides of the impeller sufficient to produce movement thereof and of the valve connected thereto, said impeller being directly responsive to said pressure differential and adapted to be moved thereby to move the valve in one direction, means in said outlet chamber and surrounding the flow passage for shielding the impeller from the velocity effect of fluid flow through the outlet chamber to the outlet, said outlet being connected to said outlet chamber so as to provide for flow through the outlet substantially normal to said flow through the flow passage, and means constantly biasing the valve toward movement in the other direction.

15. In a fluid flow regulator, the combination with a housing having an inlet and an outlet and a chamber connected to the inlet and the outlet to form a fluid circuit, of a valve in the housing and operatively connected in said circuit between the inlet and the outlet and movable to control the flow of fluid from the inlet to the outlet, means providing a flow passage through which at least a portion of the fluid from the inlet is free to pass, an impeller movable in the flow passage and connected to the valve for operation thereof, said impeller partially obstructing said flow passage and thereby being adapted to create a pressure differential on opposite sides of the impeller sufficient to produce movement thereof and of the valve connected thereto, said impeller being directly responsive to said pressure differential and adapted to be moved thereby in one direction, means constantly biasing the valve toward movement in the other direction, a passageway opening into the chamber and providing a shunt passageway around the flow passage, and means shielding the impeller from the flow of fluid through the shunt passageway.

16. In a fluid flow regulator, the combination with a housing having an inlet and an outlet and a chamber connected to the inlet and the outlet to form a fluid circuit, of a valve in the housing and operatively connected in said circuit between the inlet and the outlet and movable to control the flow of fluid from the inlet to the outlet, means providing a flow passage through which at least a portion of the fluid from the inlet is free to pass, an impeller movable in the flow passage and connected to the valve for operation thereof, means shielding the impeller from the velocity effect of fluid flow in the inlet and outlet, said impeller partially obstructing said flow passage and thereby being adapted to create a pressure differential on opposite sides of the impeller sufficient to produce movement thereof and of the valve connected thereto, said impeller being directly responsive to said pressure differential and adapted to be moved thereby to move the valve in one direction, and means constantly biasing the valve toward movement in the other direction.

17. The flow regulator of claim 10 in which said valve comprises a fixedly mounted tube within the housing in communication with the inlet and provided with a closure intermediate of its ends, a sleeve fitted slidably upon the tube and closed at its upper end, and two sets of co-acting valve ports in the tube and sleeve arranged on opposite sides of the tube and opened in varying degree in response to sliding movement of the sleeve, said sleeve being connected to the impeller to be moved thereby.

18. The fluid regulator of claim 10 in which said chamber is vertically elongated and in which said means biasing the valve toward movement in the other direction comprises a weight having a flow barrier wall opposite the port but spaced therefrom and from the walls of the housing, said weight being provided with oppositely disposed passages extending longitudinally of its body whereby some of the fluid admitted into the chamber through the port is educted downwardly to a point beyond the bottom of the weight to assure a fluid pressure equality at the top and bottom thereof.

19. The fluid regulator of claim 10 in which said port comprises an opening connecting the inlet to the chamber and said movable member of the valve includes a valve rod slidable in said opening and provided with a tapered groove to control the flow of fluid through said opening.

20. The fluid regulator of claim 10 in which said movable valving portion of the valve includes a vertically arranged ported sleeve mounted for vertical movement in the housing, and in which said biasing means comprises a weight secured to the sleeve and having a portion immediately adjacent the ports of the sleeve, said weight being provided with a passage extending therethrough from top to bottom thereof and located adjacent each port in the sleeve.

21. The fluid flow regulator of claim 10, including means operatively associated with the moving valving portion of the valve for damping movement thereof.

References Cited in the file of this patent

UNITED STATES PATENTS

| | | |
|---|---|---|
| 635,828 | Weston et al. | Oct. 31, 1899 |
| 1,579,251 | Schossow | Apr. 6, 1929 |
| 1,907,162 | Webb | May 2, 1933 |
| 1,933,852 | Hahn | Nov. 7, 1933 |
| 2,198,487 | Sisk | Apr. 23, 1940 |
| 2,307,949 | Phillips | Jan. 12, 1943 |
| 2,389,887 | Baxter | Nov. 27, 1945 |